United States Patent
Polzin

(10) Patent No.: US 7,503,140 B2
(45) Date of Patent: Mar. 17, 2009

(54) AUTOMATIC FISHING HOOK SETTING DEVICE AND METHOD OF USE

(76) Inventor: Donald H. Polzin, 4419 Twana Dr., Des Moines, IA (US) 50310

( * ) Notice: Subject to any disclaimer, the term of this patent is extended or adjusted under 35 U.S.C. 154(b) by 320 days.

(21) Appl. No.: 11/422,892

(22) Filed: Jun. 8, 2006

(65) Prior Publication Data

US 2006/0288628 A1 Dec. 28, 2006

Related U.S. Application Data

(60) Provisional application No. 60/693,223, filed on Jun. 23, 2005.

(51) Int. Cl.
*A01K 91/10* (2006.01)
(52) U.S. Cl. ............................................................. 43/15
(58) Field of Classification Search ................... 43/15, 43/16
See application file for complete search history.

(56) References Cited

U.S. PATENT DOCUMENTS

| | | | |
|---|---|---|---|
| 2,799,111 A | 7/1957 | Voboril | |
| 2,824,404 A | 2/1958 | Booth | |
| 2,858,634 A * | 11/1958 | Bremer, Jr. | 43/15 |
| 3,803,744 A | 4/1974 | deBeixedon | |
| 3,867,779 A | 2/1975 | McMaster | |
| 3,943,650 A | 3/1976 | Johansson et al. | |
| 4,091,558 A | 5/1978 | Dethlefs | |
| 4,204,355 A * | 5/1980 | Almond | 43/15 |
| 4,290,222 A * | 9/1981 | McLeod | 43/15 |
| 4,332,099 A * | 6/1982 | Morehead | 43/15 |
| 4,400,902 A | 8/1983 | Adoline | |
| 4,872,280 A | 10/1989 | Smith | |
| 5,809,684 A * | 9/1998 | Carter et al. | 43/16 |
| 6,751,900 B1 * | 6/2004 | Paulson et al. | 43/15 |
| 2006/0064918 A1 * | 3/2006 | Schnur | 43/15 |

* cited by examiner

*Primary Examiner*—Kimberly S Smith
(74) *Attorney, Agent, or Firm*—McKee, Voorhees & Sease, P.L.C.

(57) ABSTRACT

A fishing device attaches to a fishing pole so as to automatically set the fish hook when a fish takes the bait while the pole is unmanned. The device includes a retainer and a cord. The cord extends between a lower end of the pole and the retainer. A hook on the retainer mounts onto the tip eye of the pole so as to bend the pole into a flexed position. The fishing line extends through the tip eye and then through a recess in the clip. The bent pole can be left unmanned. When a fish takes the bait, the tug on the fishing line pivots the retainer so as to release the retainer from the tip eye, thereby causing the pole to spring from the bent position and thereby set the hook in the mouth of the fish while the pole remains unmanned.

4 Claims, 6 Drawing Sheets

AUTOMATIC FISHING HOOK SETTING DEVICE AND METHOD OF USE

CROSS-REFERENCE TO RELATED APPLICATIONS

This application claims priority under 35 U.S.C. § 119 of a provisional application Serial No. 60/693,223 filed Jun. 23, 2005, which application is hereby incorporated by reference in its entirety.

FIELD OF THE INVENTION

This invention provides a device or tool to automatically set a hook when fishing and the pole is unmanned.

BACKGROUND OF THE INVENTION

When a fish nibbles, bites or otherwise takes the bait, fishermen customarily jerk the rod to set the hook into the fish so it does not reject the bait and escape unhooked. Often, fishermen cast out a line but leave the pole unmanned, for example, if they are using multiple poles or have to step aside for a while. If the fisherman is not holding the pole when the fish bites, the fish may get away without being hooked. When a bite occurs yielding only a slight tug on the line, the invention allows the pole to instantly sharply set the hook even while being unmanned.

Most prior art hook setting devices utilize either a separate pole or a pole holder involving large, complex and relatively expensive systems. Other prior art hook setting devices utilize a cord to bend the pole and a tripping device to set the hook. Such devices have one or more of the following problems:

1. The device does not retain pole in a bent position from pole tip to reel, thereby not utilizing maximum possible energy.
2. The device is tied to the pole and not removable for landing the fish.
3. The device has several complex parts, which adds to cost and makes the device more difficult to carry and store.
4. The tripping force from a fish bite would have to overcome the force on the pole tip being applied by the tether. A small fish or a nibble on the bait would not release the tether and not likely result in a catch.
5. The device has to be manually released to leave the pole free for landing the fish.

Another type of prior art hook setting device uses the bent pole technique but uses a mechanism separate from the pole or a complex, multiple part device attached to the pole.

Accordingly, a primary objective of the present invention is the provision of an improved fishing aid to automatically set the hook in a fish when the fishing pole is unmanned.

Another object of the present invention is the provision of a device that can be quickly and easily installed and removed from a fishing pole for unmanned fishing.

Still another object of the present invention is the provision of a fishing aid which can be used on any type of fishing pole.

Yet another object of the present invention is an automatic fish hook setting tool which is useful in different water conditions.

Another objective of the present invention is an automatic hook setting device which allows the fisherman to adjust the sensitivity of the device.

Still another objective of the present invention is a fishing device that is useful in open water fishing and in ice fishing.

Yet another objective of the present invention is a fishing tool made of one-piece metal or plastic.

Another objective of the present invention is a device for automatically setting a fish hook that does not interfere with landing the fish.

Another objective of the present invention is a hook setting device that is simple and safe to use.

These and other objectives will become apparent from the following description of the invention.

BRIEF SUMMARY OF THE INVENTION

The present invention overcomes the lost opportunity of catching the fish when the pole is unmanned by automatically setting the hook in response to a fish taking the bait sufficiently to move the fishing line. The device of the present invention has a cord or string that loops over the reel handle or pole holder and a retainer or clip attached to the cord and having a projection or hook that engages the eye on the rod tip. When installed on the pole, the device bends the rod in an arc. The fishing line passes through a recess in the retainer beyond the rod tip. The retainer is shaped such that when a bite occurs, the line tension causes the projection to release the rod tip eye so as to jerk the line sharply and thereby set the hook. The retainer then drops to the ground and does not interfere with the subsequent landing of the fish.

DESCRIPTION OF THE DRAWINGS

Figure 2:
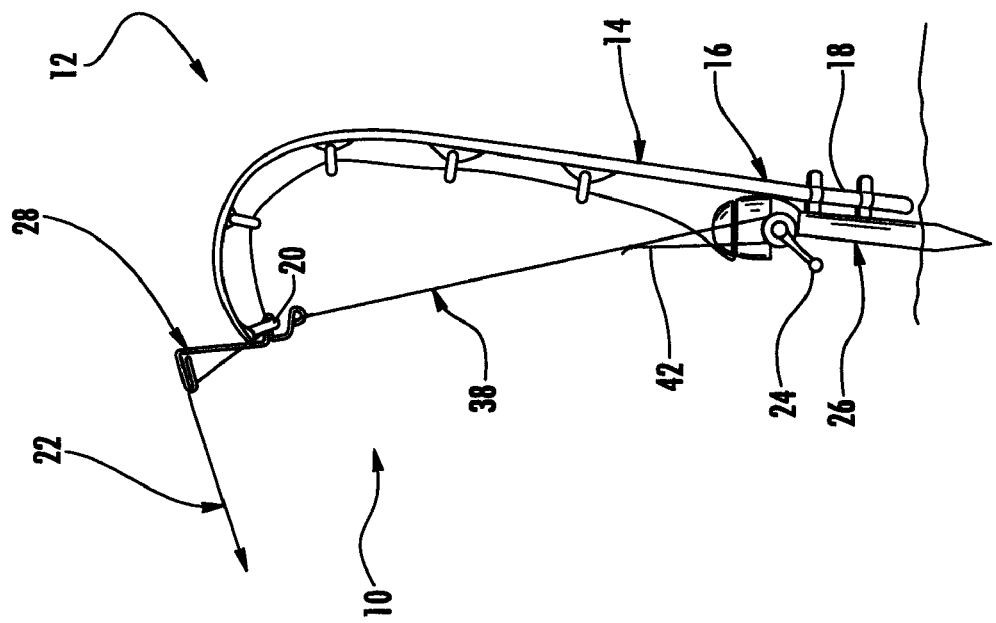
FIG. 2 shows the device of FIG. 1 installed on a fishing pole.

Fishermen customarily give a sharp jerk on the pole or rod immediately after receiving a bite or strike to set the hook into the fish's mouth. This is performed as quickly as possible for two reasons; first, to prevent the fish from expelling the bait, and secondly, to prevent the fish from swallowing the hook. This is especially important for the popular catch and release fishing program, as the fish is less likely to be seriously injured or killed. With the automatic hook setting device of the present invention, the fisherman's reaction time is eliminated as the hook is set at the instant the tug on the line occurs, resulting in a much better success ratio.

The invention is directed towards a hook setting device 10 for a fishing pole 12 (FIG. 2) which automatically sets a fish hook when a fish bites the bait, while the pole is unmanned.

The fishing pole 12 is conventional in construction, and generally includes a rod 14 and a reel 16. The rod 14 includes a handle 18 and a plurality of eyes 20. The rod 14 may be held in a pole holder 26 which is fixed to the shore, on a dock, or on a boat. The pole holder 26 may take various known forms.

Figure 1:
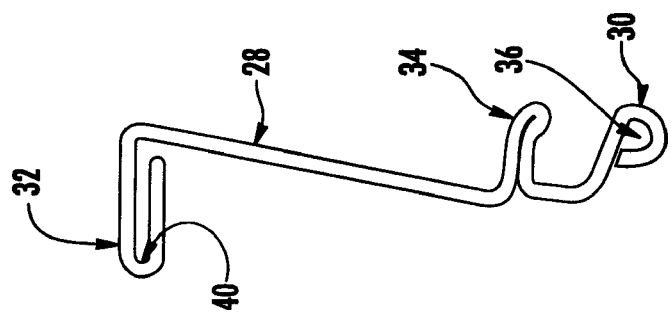
FIG. 1 shows one embodiment of the automatic fishing hook setting device of the present invention.
Figure 3:
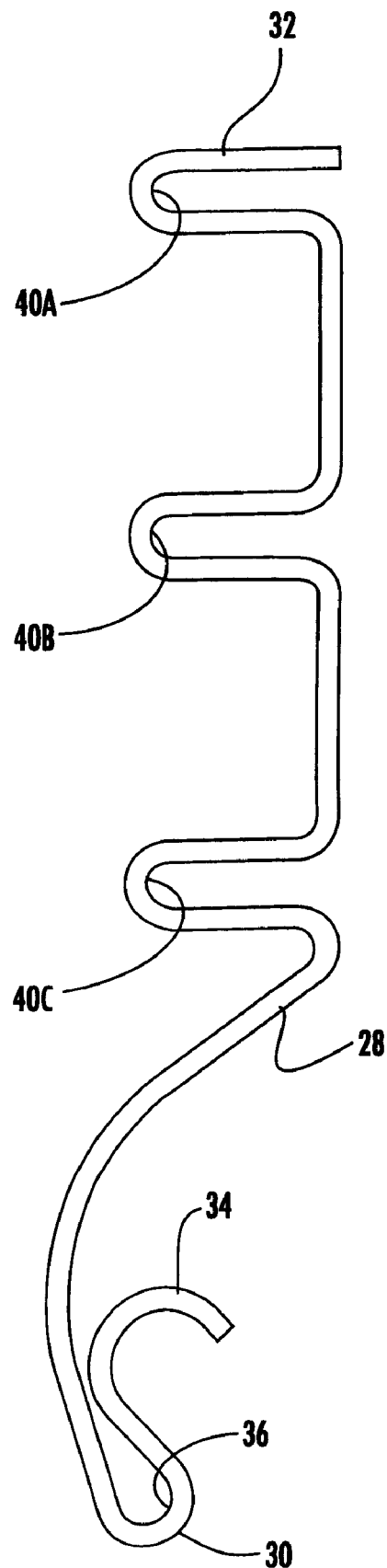
FIGS. 3-4 show alternative wire embodiments of the device of the present invention.
Figure 4:
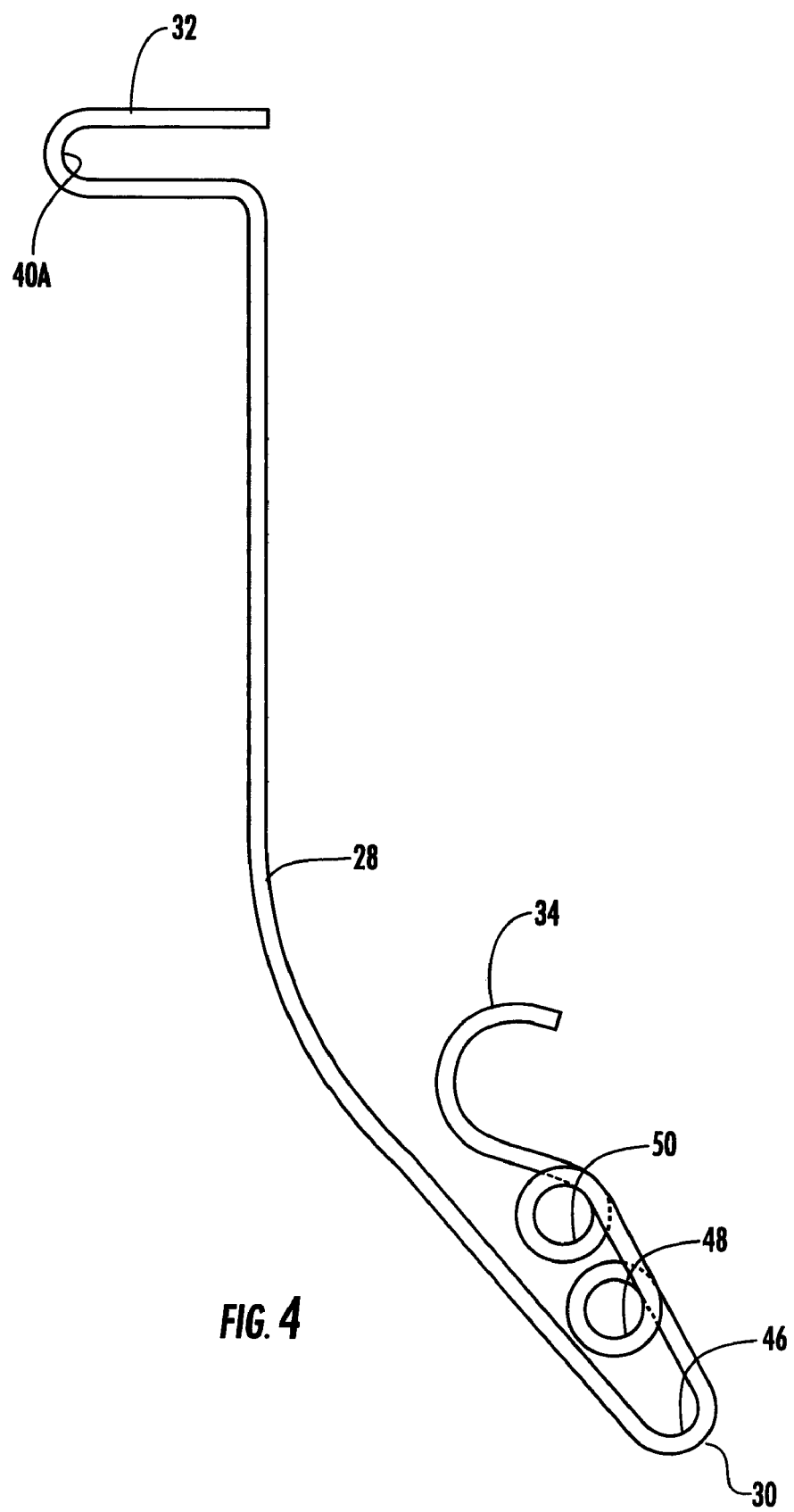
Figure 5:
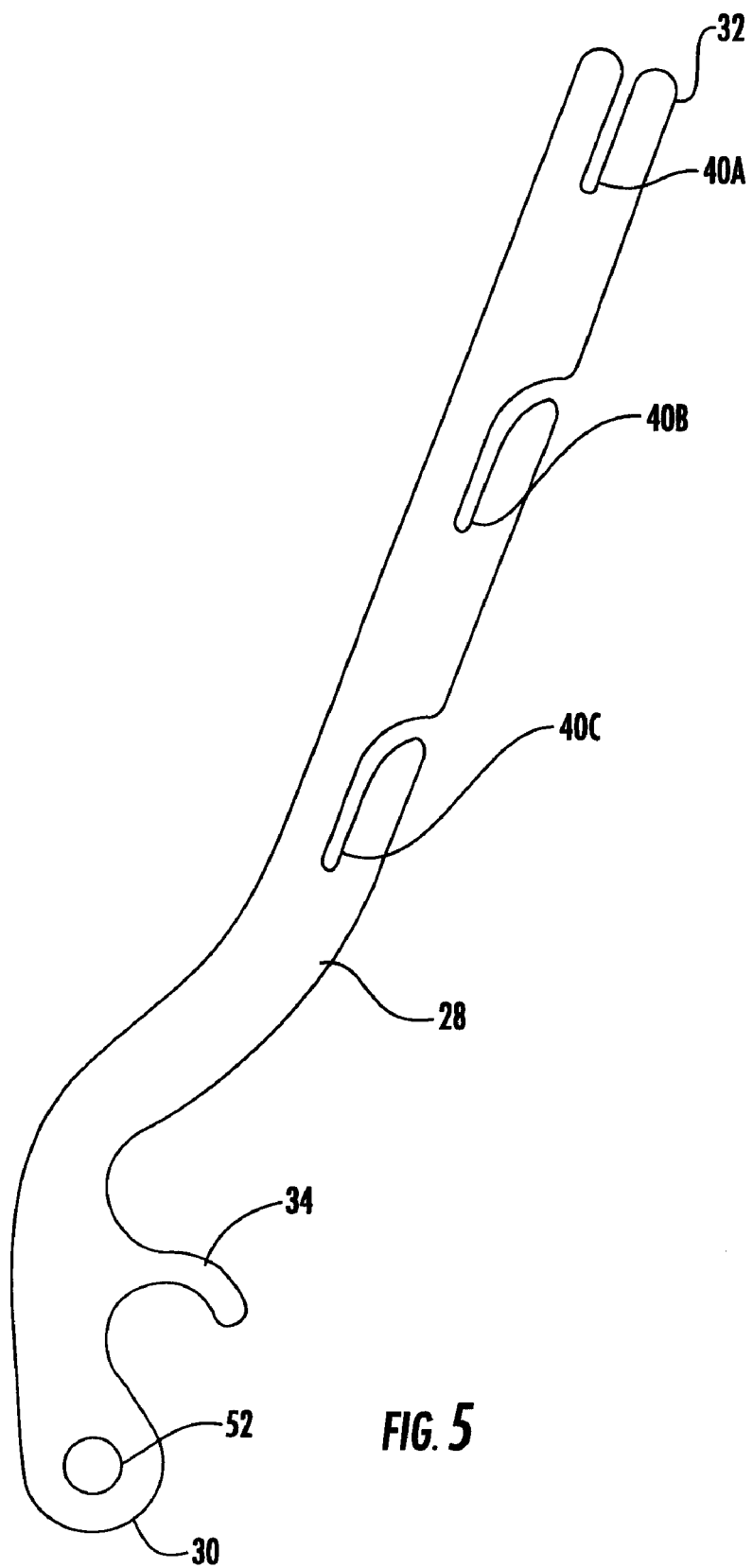
FIGS. 5 and 6 show alternative plastic or sheet metal embodiments of the device of the present invention.
Figure 6:
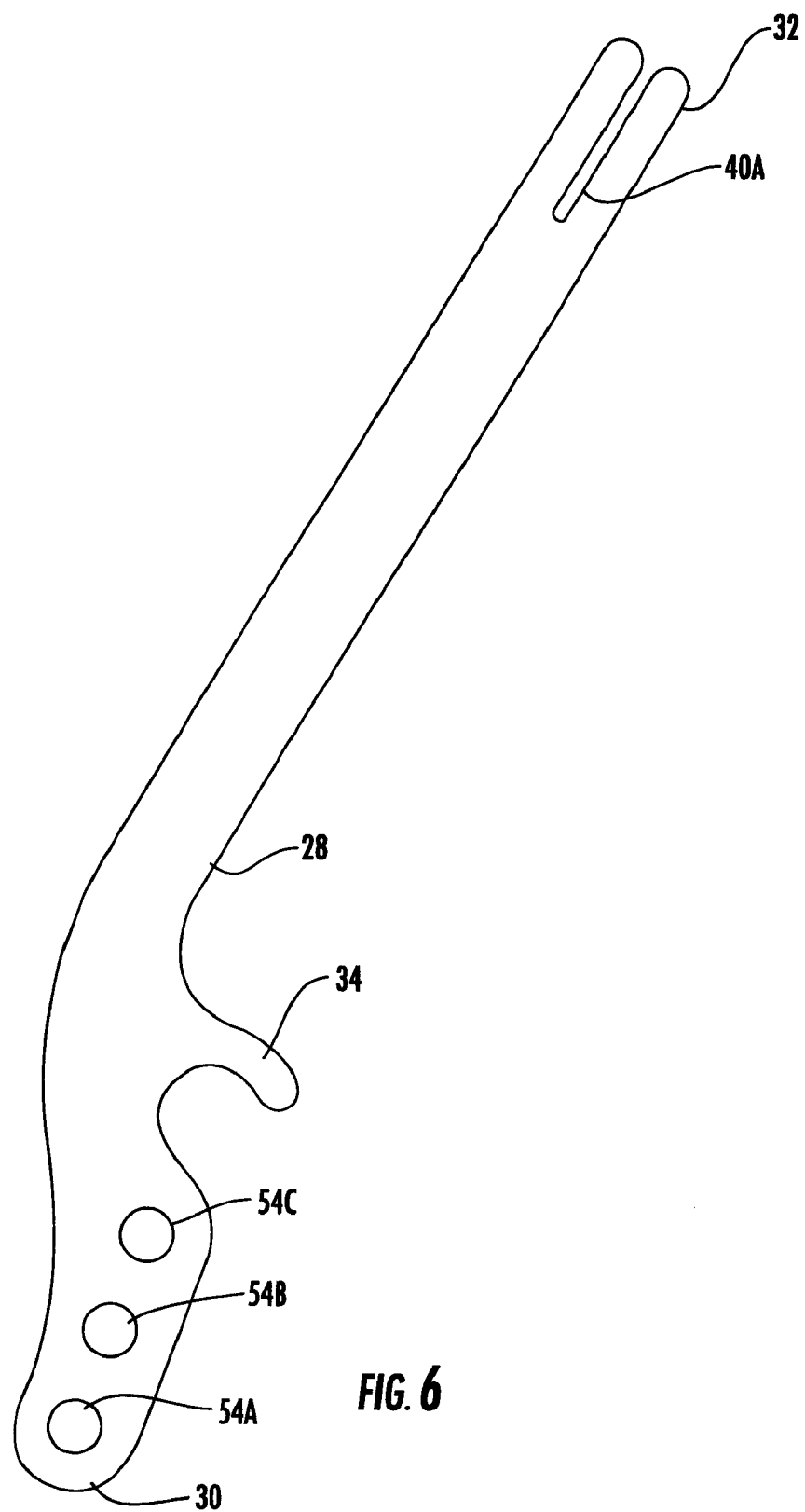

The device 10 includes a retainer or clip 28 and a cord or string 38. The retainer 28 may take various forms, shapes, and dimensions, as shown in the drawings. FIGS. 1, 3 and 4 show the retainer 28 which is formed from bent wire. Alternatively, the retainer 28 can be made of plastic or of sheet metal, such as seen in FIGS. 5-6. The basic function of the retainer 28 is the same for all forms. Therefore, the same reference numeral 28 is used in all the figures to identify the retainer. The retainer 28 has opposite ends 30, 32. A curved projection or hook 34 is formed near the first end 30 and engages the eye 20 on the rod tip. Adjacent the first end 30 is a hole or loop 36 to which the cord 38 is tied. A notch or loop or recess 40A is formed at the second end 32 of the retainer 28. Additional loops or notches 40B, 40C may also be formed in the retainer 28 so as to allow adjustment of the sensitivity of the device, as described below. The recesses 40A, 40B and 40C reside beyond the tip of the rod 14 when the retainer 28 is installed on the rod 14. The fishing line 22 extends through one of the recesses 40A-C.

In using the retainer 28 shown in FIG. 1, the cord 38 has a loop 42 which is slipped over the fishing reel 16 or its handle 18. The rod tip is arched downward and the curved hook 34 on the retainer 28 engages the tip eye 20 holding the rod in a bent condition (as seen in FIG. 2), which stores energy for "setting the hook". Finally, the line 22 leading to the bait is looped through the loop or notch 40A, as seen in FIG. 2. When a "bite" occurs, the tug on the line 22 pulls the curved hook 34 off the eye 20, thereby causing the rod 14 to spring back to its straight, unstressed condition, producing a sharp jerk to set the hook in the fish, and thereby increasing the chance of catching the fish. The retainer 28 then falls to the ground without interfering with reeling in of the line 22 to land the fish.

In FIG. 3, the cord 38 is attached to the loop 36 of the retainer 28. The fishing line 22 is cradled by one of the recesses 40A-C.

The upper notch or loop or recess 40A is located the greatest distance from the pivot defined by the curved hook 34 and thus creates the greatest moment arm for rotation. Therefore, when the line 22 is routed through the outer loop 40A less line tension is required to set the hook. This setting is used for normal conditions with relatively calm water. When fishing in fast current and/or high winds, the middle notch or loop or recess 40B, will provide hook setting without accidental tripping. The inner notch or loop or recess 40C is used for trolling in a boat using large or high draft lures.

In FIG. 4, the retainer 28 has three points 46, 48, 50 to which the cord 38 may be attached. The amount of tug on the line 22 from a bite required to release the rod tip is roughly inversely proportional to the distance from the hole or loop selected for the cord 32, to the pivot point of the curved hook 34. Basic lever laws apply.

In the retainer 28 of FIG. 5, the cord is fastened through the hole 52. The three line loops or recesses 40A, B, C function the same as for the retainer loops 40A, B, C in FIG. 3 described above. The retainer 28 shown in FIG. 6 is similar to the retainer of FIG. 4 except for material used.

In FIG. 6, the retainer 28 allows the cord 38 to be secured through any of the three holes 54A, B, C, which function the same as in the retainer in FIG. 4 above. The line 22 passes through the slot 40A at the end 32.

Figure 7:
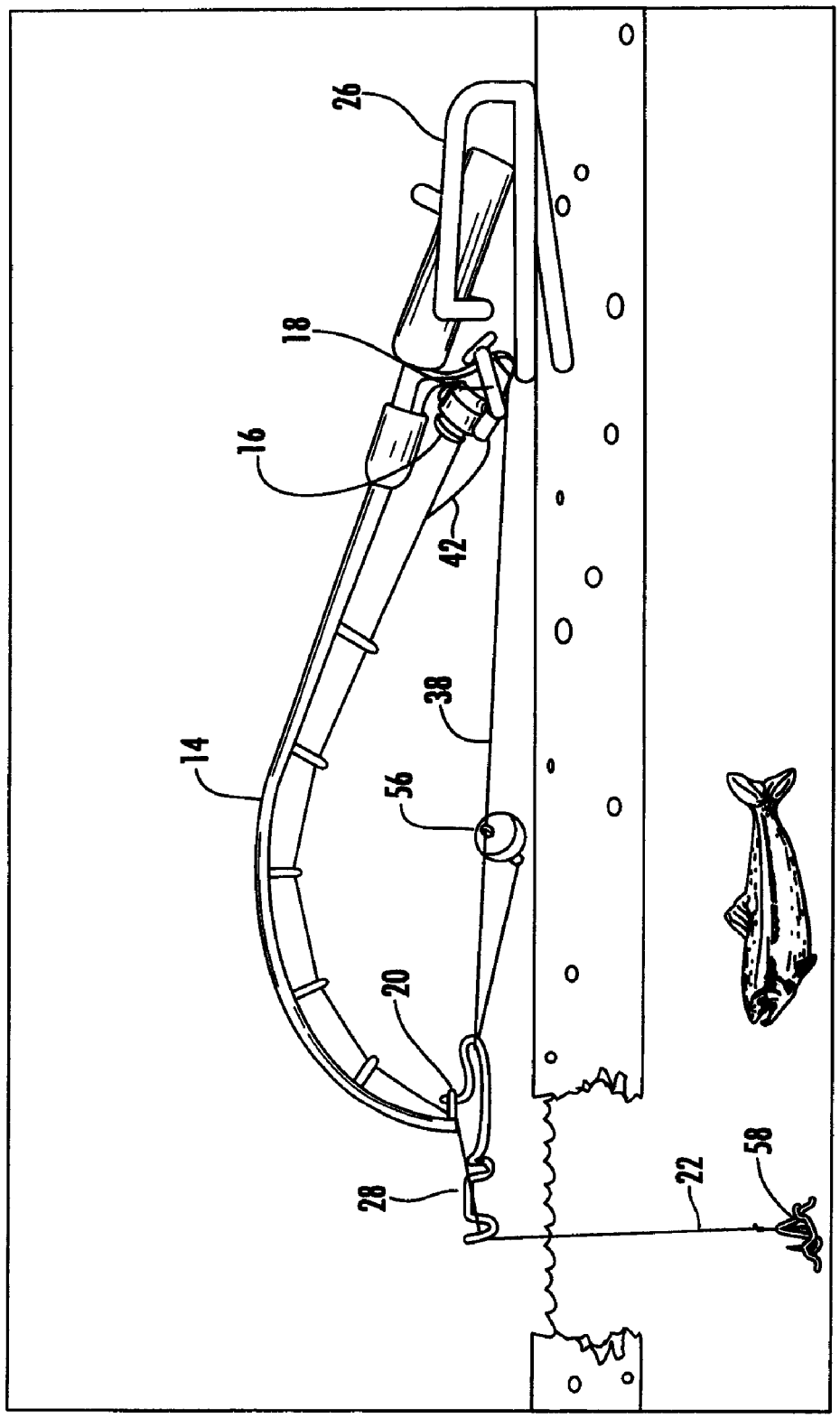
FIG. 7 is a schematic showing the device of the present invention used for ice fishing.

An additional embodiment includes the use of a common bobber 56. One end of the cord 38 is attached to the upper end of the bobber 56 and then runs up through the loop 36 on the device, and back down through the lower spring end of the bobber 56, and then to the lower loop end 42 of the cord 38, as shown in FIG. 7. By slightly compressing the bobber spring, the bobber 56 can be slid up or down the cord 38 to adjust the effective length of the cord 38, and thus adjust for different pole lengths and the desired bending of the pole 12. The bobber 56 provides another benefit in that it keeps the retainer 28 afloat should it fall in the water when fishing from a dock or in a boat.

The device 10 is very simple, small, easy to use and inexpensive. A large number of bites result in a catch. The fisherman immediately knows when a bite has occurred as the rod 14 will be straight or bending with the action of a hooked fish. The instantaneous setting of the hook results in fewer fish swallowing the hook 58, thereby making hook removal easier for the keepers and less damage to the catch and release fish. The cord 38 is tied to the device and both can easily be carried in a tackle box or shirt pocket when not in use.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A method for automatically setting a fish hook in a fish with an unmanned fishing pole, comprising:
    attached a first end of a cord to a lower end of the pole;
    bending the rod into a flexed orientation;
    inserting a retainer attached to the cord into a top eye on the pole so as to retain the pole in the flexed orientation;
    passing the fishing line through a recess in the retainer;
    putting the baited hook in the water being fished;
    leaving the pole unmanned; and
    automatically releasing the retainer from the tip eye when a fish takes the bait whereby the pole will jerk from the flexed orientation and thereby set the hook in the fish.

2. The method of claim 1 wherein the fishing line can be selectively passed through different recesses on the retainer to modify the sensitivity of the tension required to release the clip.

3. The method of claim 1 further comprising adjusting the length of the cord to accommodate different length poles.

4. The method of claim 1 further comprising attaching a bobber to the cord.

* * * * *